(12) United States Patent
Yang et al.

(10) Patent No.: US 12,153,962 B2
(45) Date of Patent: Nov. 26, 2024

(54) STORAGE TRANSACTIONS WITH PREDICTABLE LATENCY

(71) Applicant: Intel Corporation, Santa Clara, CA (US)

(72) Inventors: Ziye Yang, Shanghai (CN); James R. Harris, Chandler, AZ (US); Kiran Patil, Portland, OR (US); Benjamin Walker, Chandler, AZ (US); Sudheer Mogilappagari, Hillsboro, OR (US); Yadong Li, Portland, OR (US); Mark Wunderlich, Lake Oswego, OR (US); Anil Vasudevan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 739 days.

(21) Appl. No.: 16/849,915

(22) Filed: Apr. 15, 2020

(65) Prior Publication Data

US 2020/0241927 A1    Jul. 30, 2020

(51) Int. Cl.
*G06F 9/50* (2006.01)
*G06F 9/46* (2006.01)
(Continued)

(52) U.S. Cl.
CPC ............ *G06F 9/5027* (2013.01); *G06F 9/466* (2013.01); *G06F 9/546* (2013.01); *G06F 13/22* (2013.01);
(Continued)

(58) Field of Classification Search
None
See application file for complete search history.

(56) References Cited

U.S. PATENT DOCUMENTS

| | | |
|---|---|---|
| 6,256,660 B1 | 7/2001 | Govindaraju et al. |
| 6,295,532 B1 | 9/2001 | Hawkinson |

(Continued)

FOREIGN PATENT DOCUMENTS

| | | |
|---|---|---|
| CN | 1429024 | 7/2003 |
| CN | 104376036 | 2/2015 |

(Continued)

OTHER PUBLICATIONS

Levi, java-Using Threads to Handle Sockets—Stack Overflow, https://stackoverflow.com/questions/2828447/ using-threads-to-handle-sockets, pp. 1-13 (Year: 2010).*

(Continued)

*Primary Examiner* — Abu Zar Ghaffari
(74) *Attorney, Agent, or Firm* — Essential Patents Group, LLP; Christopher K. Gagne

(57) ABSTRACT

The disclosure concerns at least one processor that can execute a polling group to poll for storage transactions associated with a first group of one or more particular queue identifiers. The disclosure concerns at least one processor is configured to: execute a second polling group on a second processor, wherein the second polling group is to poll for storage transactions for a second group of one or more particular queue identifiers that are different than the one or more particular queue identifiers of the first group, wherein the second group of one or more particular queue identifiers are associated with one or more queues that can be accessed using the second polling group and not the first polling group.

15 Claims, 11 Drawing Sheets

(51) Int. Cl.
*G06F 9/54* (2006.01)
*G06F 13/22* (2006.01)
*H04L 67/1097* (2022.01)
*H04L 69/16* (2022.01)

(52) U.S. Cl.
CPC .......... *H04L 67/1097* (2013.01); *H04L 69/16* (2013.01)

(56) References Cited

U.S. PATENT DOCUMENTS

| | | | |
|---|---|---|---|
| 7,433,949 B2* | 10/2008 | Xu | H04L 41/00 709/224 |
| 7,702,739 B1 | 4/2010 | Cheng et al. | |
| 7,937,499 B1 | 5/2011 | Tripathi | |
| 9,378,047 B1 | 6/2016 | Gould et al. | |
| 9,619,286 B1 | 4/2017 | Wagner et al. | |
| 10,169,235 B2* | 1/2019 | Saha | G06F 12/084 |
| 10,547,559 B2 | 1/2020 | Vasudevan et al. | |
| 10,756,816 B1* | 8/2020 | Dreier | H04L 49/357 |
| 11,474,868 B1* | 10/2022 | Musa | G06Q 30/0203 |
| 2002/0114277 A1 | 8/2002 | Kyusojin | |
| 2003/0118029 A1 | 6/2003 | Maher et al. | |
| 2004/0215847 A1* | 10/2004 | Dirstine | G06F 9/4881 710/38 |
| 2004/0230875 A1* | 11/2004 | Kapauan | G06F 11/2007 714/43 |
| 2006/0143710 A1 | 6/2006 | Desai et al. | |
| 2006/0212589 A1* | 9/2006 | Hayer | H04L 69/329 709/229 |
| 2006/0233100 A1 | 10/2006 | Luft et al. | |
| 2007/0067324 A1 | 3/2007 | Burkhardt | |
| 2007/0067770 A1 | 3/2007 | Thomasson | |
| 2007/0130367 A1 | 6/2007 | Kashyap | |
| 2007/0143430 A1 | 6/2007 | Johnson et al. | |
| 2009/0217369 A1* | 8/2009 | Abeni | H04L 47/10 726/13 |
| 2010/0169888 A1 | 7/2010 | Hare et al. | |
| 2011/0019552 A1 | 1/2011 | Karaoguz et al. | |
| 2011/0128923 A1 | 6/2011 | Cilli et al. | |
| 2011/0142064 A1 | 6/2011 | Dubal et al. | |
| 2011/0296415 A1 | 12/2011 | Khan et al. | |
| 2012/0020214 A1 | 1/2012 | Brown et al. | |
| 2012/0039337 A1 | 2/2012 | Jackowski et al. | |
| 2012/0078994 A1 | 3/2012 | Jackowski et al. | |
| 2012/0240119 A1 | 9/2012 | Xie et al. | |
| 2012/0240185 A1 | 9/2012 | Kapoor et al. | |
| 2013/0077486 A1 | 3/2013 | Keith | |
| 2013/0138760 A1* | 5/2013 | Tsirkin | G06F 9/546 709/213 |
| 2013/0142066 A1 | 6/2013 | Yamaguchi et al. | |
| 2013/0203422 A1 | 8/2013 | Masputra et al. | |
| 2013/0204965 A1 | 8/2013 | Masputra et al. | |
| 2013/0298201 A1 | 11/2013 | Aravindakshan et al. | |
| 2014/0064295 A1 | 3/2014 | Deisinger et al. | |
| 2014/0096165 A1 | 4/2014 | Bei et al. | |
| 2014/0280709 A1 | 9/2014 | Li et al. | |
| 2014/0281058 A1 | 9/2014 | Solihin | |
| 2014/0351206 A1 | 11/2014 | Lim | |
| 2015/0012864 A1 | 1/2015 | Goodwin et al. | |
| 2015/0049769 A1 | 2/2015 | Tamir et al. | |
| 2015/0055468 A1 | 2/2015 | Agarwal et al. | |
| 2015/0067819 A1 | 3/2015 | Shribman et al. | |
| 2015/0156124 A1 | 6/2015 | Tsuji | |
| 2015/0277997 A1 | 10/2015 | Pope et al. | |
| 2015/0334008 A1 | 11/2015 | Kim et al. | |
| 2016/0232111 A1 | 8/2016 | Chang et al. | |
| 2016/0378545 A1 | 12/2016 | Ho | |
| 2017/0048774 A1 | 2/2017 | Cheng et al. | |
| 2017/0103031 A1* | 4/2017 | Liu | G06F 13/24 |
| 2017/0147522 A1 | 5/2017 | Yu et al. | |
| 2017/0187640 A1 | 6/2017 | Vasudevan et al. | |
| 2017/0324637 A1* | 11/2017 | Emam | G06F 9/541 |
| 2018/0287923 A1 | 10/2018 | Emam et al. | |
| 2018/0335957 A1 | 11/2018 | Enz et al. | |
| 2019/0079883 A1* | 3/2019 | Wang | G06F 9/542 |
| 2019/0245924 A1* | 8/2019 | Li | G06F 3/0635 |
| 2020/0127934 A1* | 4/2020 | Fu | H04L 47/6255 |
| 2020/0186579 A1* | 6/2020 | Adams | H04L 67/02 |
| 2020/0396126 A1* | 12/2020 | L'Ecuyer | H04L 41/0886 |
| 2021/0075745 A1* | 3/2021 | Badger | H04L 43/10 |
| 2021/0216459 A1* | 7/2021 | Benhanokh | G06F 13/1663 |

FOREIGN PATENT DOCUMENTS

| | | |
|---|---|---|
| CN | 103038652 | 11/2016 |
| JP | 2002185509 | 6/2002 |
| JP | 2015527755 | 9/2015 |
| WO | 2017112326 | 6/2017 |

OTHER PUBLICATIONS

International Search Report and Written Opinion for PCT Patent Application No. PCT/US20/65116, dated Apr. 9, 2021, 10 pages.

"Mellanox Message Acceleration Software Enables Lowest-Latency for a Wide Range of Financial Services and Web 2.0 Applications", Press Release, Mellanox Technologies, May 16, 2011, 3 pages.

"Optimizing storage applications based on Kernel TCP/IP stack", ACM, Aug. 17-20, 2020, Edmonton, Canada, 10 pages.

Bureddy, Devendar, "Enabling Exascale Co-Design Architecture", Mellanox Technologies, OSU Mug, Aug. 2017, 95 pages.

Dumazet, Eric, "Busy Polling: Past, Present, Future", Google, netdev 2.1, Montreal, 2017, 4 pages.

Harris, Jim, "SPDK NVMe-oF TCP Transport", https://spdk.io/news/2018/11/15/nvme_tcp/, Nov. 15, 2018, 1 page.

Intel, "Performance Testing Application Device Queues (ADQ) with Redis*", Solution Brief, Intel Connectivity, Ethernet Networking Division, Mar. 8, 2019, 7 pages.

Kamath, Aditya, "Performance Analysis of Linux Kernel Library User-Space Tcp Stack", salesfoce engineering, https://engineering.salesforce.com/performance-analysis-of-linux-kernel-library-user-space-tcp-stack-be75fb198730/, dowloaded form the internet on Jun. 22, 2022, 6 pages.

Vasudevan, Anil, "Intel Ethernet 800 Series With Application Device Queues [ADQ]", Interconnect Day, Apr. 8, 2019, 23 pages.

Li, Huaicheng, et al., "LeapIO: Efficient and Portable Virtual NVMe Storage", Proceedings of the Twenty-Fifth International Conference on Architectural Support for Programming Languages and Operating Systems (ASPLOS '20), Mar. 16-20, 2020, Lausanne, Switzerland. ACM, New York, NY, USA, 15 pgs.

Ousterhout, Amy, et al., "Shenango: Achieving High CPU Efficiency for Latency-sensitive Datacenter Workloads", Proceedings of the 16th USENIX Symposium on Networked Systems Design and Implementation (NSDI '19). Feb. 26-28, 2019, 18 pgs.

Xing, Michael, et al., "A New Windows Monolithic NVMe SSD Driver In Cloud", 2019 Storage Developer Conference, Sep. 23-26, 2019, Santa Clara, CA, 26 pgs.

Ousterhout, Amy, et al., "Shenango: Achieving High CPU Efficiency for Latency-sensitive Datacenter Workloads", 16th USENIX Symposium on Networked Systems Design and Implementation (NSDI '19). Feb. 26-28, 2019, 21 pgs.

Extended European Search Report for European Patent Application No. 16879810.6, dated May 22, 2019.

Extended European Search Report from European Patent Application No. 20931601.7 notified Apr. 4, 2024, 7 pgs.

Final Office Action for U.S. Appl. No. 16/773,801, dated Dec. 5, 2022.

International Search Report and Written Opinion for PCT Patent Application No. PCT/US2016/063718, dated Mar. 8, 2017.

Non-Final Office Action from U.S. Appl. No. 18/201,068 notified Mar. 27, 2024, 21 pgs.

Notice of Allowance for U.S. Appl. No. 16/773,801, dated Jan. 25, 2022.

Office Action for Chinese Patent Application No. 201611054171.8, dated Aug. 6, 2019.

Office Action for Chinese Patent Application No. 201611054171.8, dated Feb. 28, 2020.

(56) References Cited

OTHER PUBLICATIONS

Office Action for Japanese Patent Application No. 2016-234995, dated Jul. 31, 2018.
Office Action for Japanese Patent Application No. 2016-234995, dated Nov. 21, 2017.
Office Action for U.S. Appl. No. 16/773,801, dated Jul. 15, 2022.
Office Action for U.S. Appl. No. 16/773,801, dated Jul. 6, 2022.
Office Action for U.S. Appl. No. 16/773,801, dated Mar. 30, 2021.
Office Action for U.S. Appl. No. 16/773,801, dated Sep. 13, 2021.
Office Action from Chinese Patent Application No. 202111569280.4 notified Nov. 30, 2023, 3 pgs.
"Configure Class of Service", <https://docs.vmware.com/en/VMware-SD-WAN/5.4/VMware-SD-WAN-Ad. . . stration-Guide/GUID-AF976888-0795-4EDC-ACOF-4C81E4F541F2.html> May 22, 2023, 4 pgs.
"DSCP to Queue", retrieved online via https://www.cisco.com/assets/sol/sb/Switches_Emulators_v2_3_5_xx/help/350_550/tesla_350_550_olh/dscp_to_queue.html; Nov. 16, 2021.
"Dynamic Multipath Optimization", <https://docs.vmware.com/en/VMware-SD-WAN/5.4/VMware-SD-WAN-A . . . tration-Guide/GUID-BEDE8CBD-D55B-4AB4-949C-E7CC35ADF034.html> accessed online Dec. 8, 2023, 20 pgs.
"Dynamic Multipath Optimization", White Paper, Dec. 2020, 18 pgs.
"Embracing the Future of Data Management: the Potential Benefits of Application Device Queue in Vmware Vsan", <https://www.mrvsan.com/embracing-the-future-of-data-management-the-potential-benefits-of-application-device-queue-in-vmware-vsan/> Jul. 7, 2023, 3 pgs.
"PyMOTW", Published Jan. 2, 2014; Publisher: Doug Hellmann (The Phython Standard Library By Example).
"Show 257: VeloCloud SD-WAN: Sponsored", <https://packetpushers.net/podcast/show-257-velocloud-sd-wan-sponsored/> Oct. 2, 2015, 4 pgs.
"Software Defined Cloud Connector for WSS", Symantec 2018, 5 pgs.
"VeloCloud's SD-WAN puts packet steering on steroids to optimize performance", <https://www.networkworld.com/article/939110/veloclouds-sd-wan-puts-packet-steering-on-steroids-to-optimize-performance.html> accessed online Dec. 8, 2023, 5 pgs.
"VMware SD-WAN Edge platform specifications", Nov. 2023, 18 pgs.
"VMware SD-WAN QoS Overview", DMPO and integration with MPLS QoS, Solution Overview, 9 pgs.
Herbert, T., "[Patch] net: add Documentation/networking/scaling.txt", Jul. 31, 2011; retrieved online via https://www.spinics.net/lists/linux-doc/msg02975.html, Nov. 1, 2021.
Yang, Ziye, "SPDK based user space NVMe over TCP transport soution", 2019 Storage Developer Conference, Intel Corporation, Sep. 23-26, 2019, Santa Clara, CA, 29 pgs.
Yang, Ziye, et al., "uNVMe-TCP: A User Space Approach to Optimizing NVMe over Fabrics TCP Transport", Springer Nature Switzerland AG 2020, pp. 125-142.
Office Action from Chinese Patent Application No. 202111569280.4 notified Jun. 19, 2024, 8 pgs.
Extended European Search Report from European Patent Application No. 24177348.0 notified Jul. 1, 2024, 7 pgs.

\* cited by examiner

STORAGE TRANSACTIONS WITH PREDICTABLE LATENCY

The Non-Volatile Memory Express® (NVMe®) Specification describes a system for accesses to data storage systems through a Peripheral Component Interconnect Express (PCIe) port. NVMe® is described for example, in NVM Express® Base Specification, Revision 1.3c (2018), as well as predecessors, successors, and proprietary variations thereof, which are incorporated by reference in their entirety. NVMe® allows a host device to specify regions of storage as separate namespaces. A namespace can be an addressable domain in a non-volatile memory having a selected number of storage blocks that have been formatted for block access. A namespace can include an addressable portion of a media in a solid state drive (SSD), or a multi-device memory space that spans multiple SSDs or other data storage devices. A namespace ID (NSID) can be a unique identifier for an associated namespace. A host device can access a particular non-volatile memory by specifying an NSID, a controller ID and an associated logical address for the block or blocks (e.g., logical block addresses (LBAs)).

DETAILED DESCRIPTION

Distributed block storage systems provide block device functionality to applications by presenting logical block devices that are stored in segments scattered across a large pool of remote storage devices. To use these logical block devices, applications determine the location of the segments to access. A computing platform can access a storage device using a fabric or network. Various storage protocols exist that enable access to storage devices using a network or fabric. For example, the Non-volatile Memory Express over Fabrics (NVMe-oF) specification is designed to enable access to remote NVMe compatible solid state drives (SSDs). For example, NVMe-oF is described at least in NVM Express Base Specification Revision 1.4 (2019). NVMe-oF compatible devices provide high performance NVMe storage drives to remote systems accessible over a network or fabric.

Figure 1:
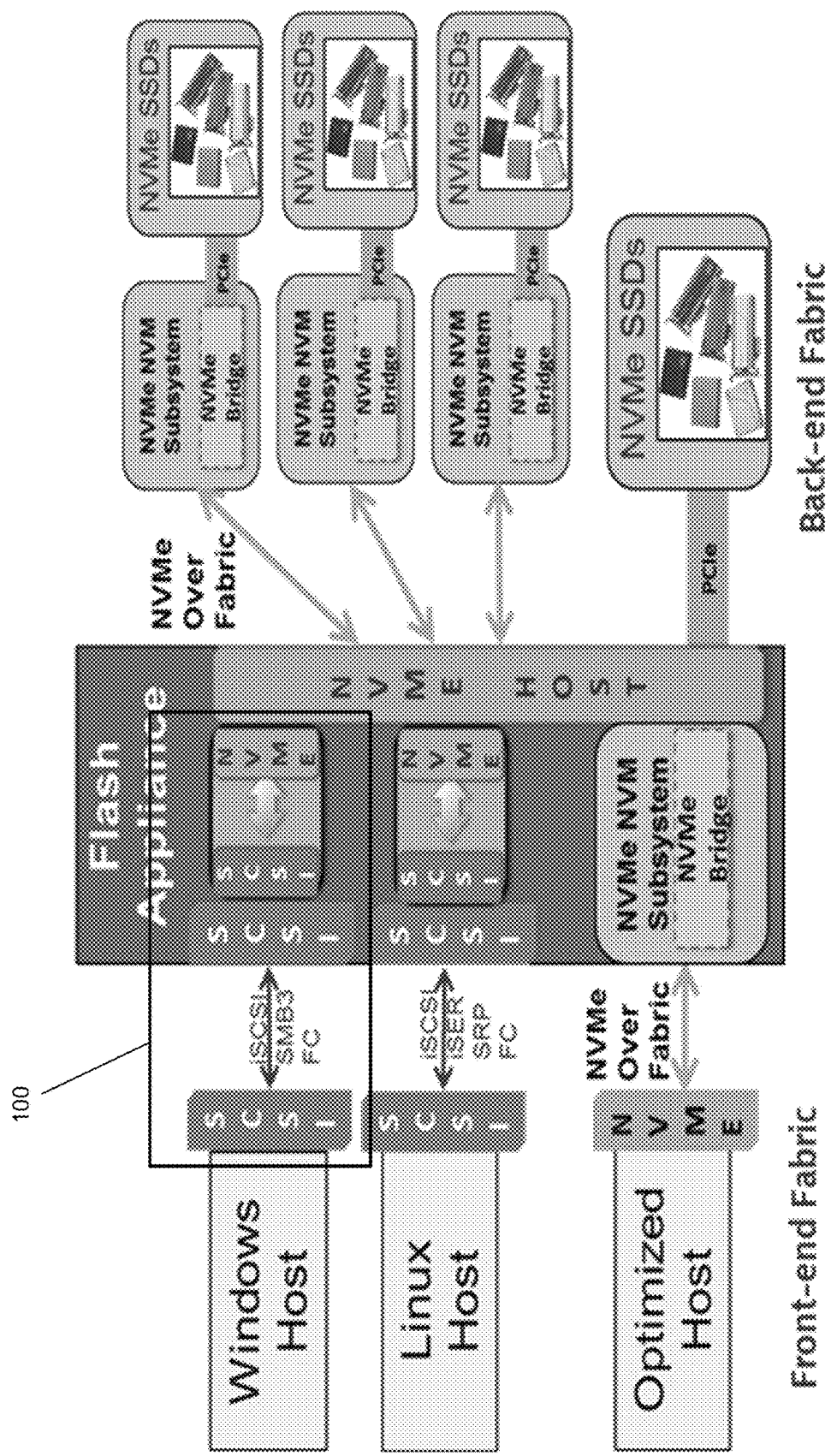
FIG. 1 depicts an example of a system that is NVMe-oF and Internet Small Computer Systems Interface (iSCSI) protocol compatible.

FIG. 1 depicts an example of a system that is NVMe-oF and Internet Small Computer Systems Interface (iSCSI) protocol compatible. With the emergence of NVMe compatible solid state drives (SSDs), re-use of the existing iSCSI protocol to allow access to SSDs to remote host devices can involve protocol conversions 100 (e.g., NVMe-to-SCSI-to-iSCSI and iSCSI-to-SCSI-to-NVMe). The NVMe-oF protocol can mitigate such issue by providing various transport layers for NVMe transactions such as remote direct memory access (RDMA), Fibre Channel (FC), and recently, Transmission Control Protocol (TCP).

In 2018, a specification involving TCP transport (e.g., TP-8000 NVMe-oF™ TCP Transport Binding) was released for NVMe-oF. The purpose of T-8000 is to re-use existing networking infrastructure because legacy network interface controllers (NICs) and switches may not support remote direct memory access (RDMA) related protocols. With TCP transport support, re-use of existing network infrastructures can take place to ease the transition from iSCSI to NVMe-oF. Accordingly, there are several well-known transport layer protocols (e.g., RDMA, FC, and TCP) defined and supported by NVMe-oF. Developers can implement an NVMe-oF target or initiator using one or more different transports according to the specification to present an NVMe subsystem to remote hosts (initiators).

NVMe-oF over TCP can allow communications over the Internet whereas NVMe-oF over RDMA or FC are used in a data center and are limited in distance. However, in some cases, NVMe-oF over TCP can be slower with less determinate transit time. Software and hardware solutions can improve the NVMe-oF TCP transport performance in user space. Software solutions including leveraging user space TCP/IP stack, Data Plane Development Kit (DPDK), Storage Performance Development Kit (SPDK). Hardware offloading allows leveraging some offloading methods (e.g., field programmable gate arrays (FPGAs), or offloading operations which are conducted by CPU cores into an RDMA core) in order to save the CPU resources for other important tasks in order to improve the performance of applications.

Some data centers may have a target performance determinism, such as to meet contractual requirements or as a competitive differentiator. Providing the desired performance determinism (e.g., 99.99 percentile latency, with consistent throughput and central processor unit (CPU) utilization) for distributed systems applications in this environment may be a challenge. In many cases, the networking interface is one of the primary contributors to indeterminant performance (e.g., latency and tail latency), as it can become a bottleneck to application performance on a server. Tail latency can refer to a percentage of response times from a system, out of all of responses to the input/output (I/O) requests it serves, that take the longest in comparison to the bulk of its response times. Tail latency can refer to worst-case latencies seen at very low probability. Tail latency can also be measured from a cumulative probability distribution and it can have the lowest latency X such that latency>X occurs with probability no more than $10^{-15}$.

Various embodiments attempt to reduce latency and tail latency of NVMe-oF over TCP transactions using an application device queue feature available to a network interfaces and a busy polling scheme that reduces system calls and context switches. Various embodiments provide dedicated and isolated queues to store received packets from a network interface to user space or dedicated and isolated queues for packets that are to be transmitted by a network interface. Various embodiments use an Application Device Queue (ADQ) of a network interface as the isolated queues.

TCP connections on a configured traffic class (TC) can be allocated to isolated queues, and the queue identifier of a queue can be determined by the underlying kernel in a manner to achieve uniqueness of associated application. For example, if an application has allocated 4 queues, then the queue identifier (e.g., NAPI_ID) allocated by the kernel can be from 400, 401, 402, to 403 and the queue identifier for each connection can be randomly distributed by the kernel with fairness. For example, if there are 200 connections on 4 queues, and the kernel tries load balance among the 4 queues, 50 connections can be allocated for each queue identifier. However, connections can be allocated on a weighted basis so that connections are not evenly distributed. For example, connection placement may be weighted by factors such as service level agreement (SLA), workload of a polling group, activity or inactivity level of a core, and so forth. Connections with the same queue identifier on the socket can be distributed to the same polling group. A polling group can be executed on a dedicated CPU core (e.g., thread), thus the connections with the same queue identifier can be executed by the same CPU core to avoid resource contention among different CPUs handling the same connections. A polling group can detect events of all connections associated with the polling group. A polling mode can be applied that allows an application to poll for data in user space without switching to kernel mode to reduce context switches and system calls from kernel space to user space.

In some examples, after an NVMe-oF TCP target starts, a service listener operates on different service portals (e.g., TCP socket (e.g., <IP address, port>)) and when a new socket connection is added between a transmitter and a target, the connection can be allocated to a queue and queue identifier (e.g., NAPI_ID).

Various embodiments can be applied to any other storage applications based on SPDK acceleration framework, e.g., Internet Small Computer Systems Interface (iSCSI), Network File System (NFS). Various embodiments can be applied to memory pool transactions or any queueing of work requests (e.g., function as a service (FaaS)).

Figure 2:
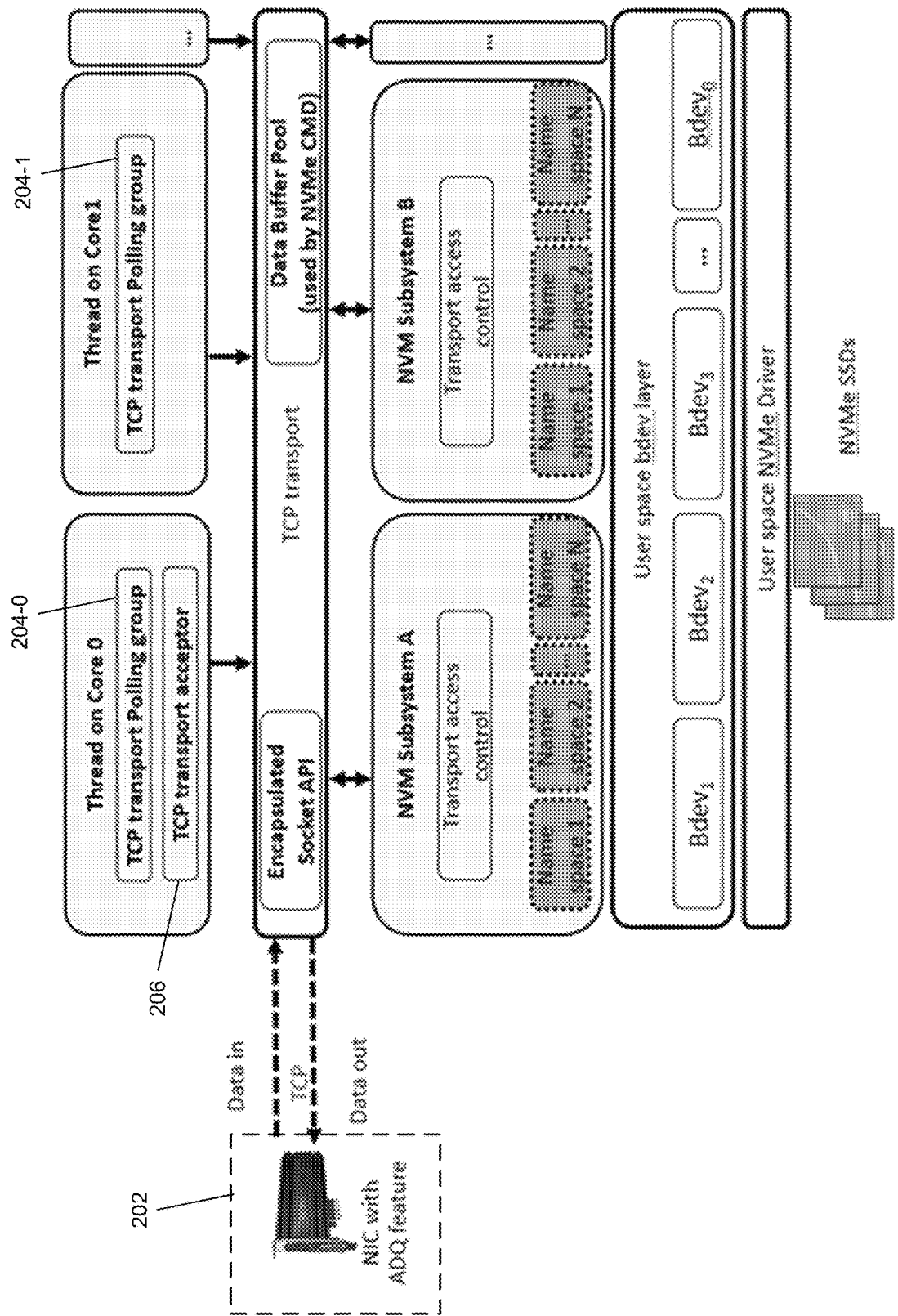
FIG. 2 shows an architecture for NVMe-oF using a TCP transport.

FIG. 2 shows an architecture for NVMe-oF using a TCP transport. The architecture can be used by a target device and system with access to one or more solid state drives (SSDs) or other memory or storage devices. A network interface 202 can provide dedicated queues (e.g., ADQ). Network interface 202 can filter application traffic to a dedicated set of queues based on connection identifiers (e.g., TCP socket). For example, TCP is described at least in RFC 793. In some examples, network interface 202 can use network traffic class (TC) filtering to map the application's TCP connections to dedicated queues. An application can use a priority setting to bind incoming TCP connections to specified queue(s) (e.g., setsockopt(fd, SOL_SOCKET, SO_PRIORITY, & priority, 4)). In this example, fd can be a file descriptor to set the socket priority, and the priority can be a defined TC (traffic class) identified by the network interface for queue assignment. A queue can be application-specific such that only the application can use the queue to receive or transmit packets and a queue is not shared with another application to avoid contention from different applications accessing the same queue. If a core that executes an application handles connections from different queues, then the core fetches data from different queues and contentions and locks can occur as a result, which can cause performance degradation and increase in packet processing time. Additionally, application-specific outgoing network bandwidth can be rate-limited by network interface 202, which can be used to divide or prioritize network bandwidth for specific applications.

TCP transport acceptor 206 can be registered as a non-timer poller on a thread of core 0. In some examples, TCP transport acceptor 206 can be deployed on a thread on core 1. TCP transport acceptor 206 can be determined to run on a specified CPU core with a policy determined by an application. TCP transport acceptor 206 can listen on a portal (e.g., through spdk_sock_accept function) managed by the transport. When there is an incoming socket connection event, a new TCP connection with the socket information can be created (e.g., spdk_sock), and such connection can be managed by a dedicated non-timer poller (e.g., TCP transport polling group 204-0). For an incoming socket connection, the application can issue getsockopt system call for Linux to obtain hardware queue identifier information (e.g., NAPI_ID). TCP transport acceptor 206 can map connections which have the same queue identifier (e.g., NAPI_ID) to the same TCP transport polling group. Some embodiments use a round robin (RR) scheme to select a CPU core for processing a received packet, and sends an async message through event call to let the dedicated thread to add the TCP connection to its polling group. In some examples, weighted round robin allocation can be used using factors such as SLA, workload of a polling group, activity or inactivity level of a core, and so forth.

For n hardware queues allocated for an NVMe-oF target, supposing the NAPI_ID ranges from A, A+1, . . . , A+n−1, e.g., there are n different queues. When TCP transport acceptor 206 accepts a connection, it will check the NAPI_ID of the connections, and select a polling group which serves the same NAPI_ID connections. If no such polling group is found, then TCP transport acceptor 206 will choose a polling group that serves a lower number of connections, and mark the polling group that serves such NAPI_ID connection. ADQ can accelerate processing of multiple connections by the same CPU core by grouping connections together under the same NAPI_ID and avoid locking or stalling from contention for queue accesses (e.g., read or write).

The following is an example pseudo code to assign a priority to a connection and determine a queue identifier for the connection. A polling group can be assigned to a connection because the polling group is associated with the queue identifier.

```
/* create a listenfd */
    int listenfd= socket(AF_INET, SOCK_STREAM,0);
/* set priority number be same with the setting in the script configured for the application */
setsockopt(listen_fd, SOL_SOCKET, SO_PRIORITY, &priority, sizeof(priority));
/* Define address */
struct sockaddr_in addr;
addr.sin_family = AF_INET; //protol ipv4
```

```
addr.sin_port = htons(5888); //port
addr.sin_addr.s_addr = htonl(INADDR_ANY);//use the address from the host
/*bind the listener fd to the address */
if(bind(listenfd,(const struct sockaddr *)&addr ,sizeof(addr))==-1)
    {
        ERR_EXIT("bind");
    }
    /* listen the socket */
    if(listen(listenfd,SOMAXCONN)<0)
    {
        ERR_EXIT("Listen");
    }
    struct sockaddr_in peeraddr;
    socklen_t peerlen = sizeof(peeraddr);
/*get a new connection*/
int new_fd ;
new_fd = accept(listenfd,(struct sockaddr*)&peeraddr,&peerlen);
/* get the napi_id info and put it the napi_id variable */
getsockopt(new_fd, SOL_SOCKET, SO_INCOMING_NAPI_ID, napi_id, &salen);
```

Performing listenfd causes attention to <ipaddress, port> for a new file descriptor. Performing setsockopt sets a priority for this new file descriptor. Calling getsockopt obtains a queue identifier (NAPI_ID) on the "new_fd". Different new_fd represent an active connection that can be used on this connection with read/write. If a connection is to be mapped to a polling group, then the file descriptor (fd) of the connection can be managed by a group polling. If the polling group is managed by eventfd mechanisms, then the fd will be added into the epoll group via epoll_ctl function. When the connection is ready to close, it will be removed from the epoll group also via epoll_ctl but with different parameters.

TCP transport acceptor 206 maintains a global mapping list maintains the mapping for the relationship between NAPI_ID and polling groups. The following shows a pseudo code representation for adding or removing a connection to a polling group.

Allocate a polling group for a new connection:
  Search the global mapping list via NAPI_ID:
    (A) If it exists a mapping X, increase the X.ref_num in the found mapping entry; increase the connection_number owned by the polling group (X.Polling_group) in the mapping and return;
    (B) If the mapping does not exist, select a polling group which has the least connection_number (mark this polling group as PG_F). Create a mapping entry, and update <NAPI_ID, PG_F, ref_num=1> in the global mapping list. And also increase the collection number for the find polling group (PG_F.connection_num++)
Remove the mapping when a connection is destroyed:
  Search the global mapping list via NAPI_ID, a mapping entry named as X entry must be found, then
    Reduce the ref_num of the entry X, e.g., X. ref_num—.
    Decrease the connection number of the polling group in X, X.polling_group.
      Connection_number—;
    If X.ref_num is 0, free the entry of X in the global mapping list.

In this example, TCP transport polling group 204-0 can execute on a thread of core 0 whereas TCP transport polling group 204-1 can execute on a thread of core 1. A thread can be an instance of a program executed by a CPU core. When a TCP connection is added to a corresponding TCP polling group, the socket owned by this connection is added to the socket polling group. For example, an epoll related operation (e.g., epoll_ctl) in Linux can be used to add the socket information into the socket polling group and a socket group polling can be used. For example, epoll_wait can be used to check the READ data event for a connection. In a polling group, if a read event is detected for a socket file descriptor (fd), the NVMe/TCP PDU (packet data unit) protocol parsing module can issue a read system call to read the contents on this fd in order to identify the PDU. For example, if a protocol parsing module determines a NVMe command is in a PDU (e.g., a PDU with NVME_TCP_PDU_TYPE_I-C_REQ type in SPDK), then a protocol parsing module can conduct the NVMe command operation according to the NVMe-oF protocol. When a TCP connection is closed detected by the state of the owned socket, this connection is removed from the socket polling group and no longer be polled by the group.

A polling group can be executed on a dedicated CPU core. A polling group can manage the life cycle of all the TCP socket-based connections in a group, e.g., handle the I/Os on each socket-based connection including read or write I/Os; monitoring the data in event on each socket descriptor from the network; and terminating the socket for any error cases (e.g., the network connection is broken). In the same polling group, to detect incoming data on one or more connections, an epoll scheme can be used to detect a read event of the one or more connections to determine which connection is active or not. For example, epoll is a Linux kernel system call for a scalable I/O event notification mechanism. In some examples, instead of epoll, FreeBSD's kqueue can be used. TCP transport polling group 204-0 or 204-1 can delay interrupts to an application for received packets if the application is alert/alive due to invoking busy polling. For example, the following steps can take place during polling: 0) create an epoll event group via (epoll_create function in Linux) and 1) call epoll_wait function to determine which connection has incoming data.

For received packets, a driver copies packet to a host memory (e.g., direct memory access (DMA)), writes descriptor to host memory but during busy polling, the driver does not issue interrupts to an application and the application does not enter sleep state in busy polling. For example, the driver can defer interrupt enablement while application busy polls. An application can stay awake proactively busy polling queues to see if work has arrived. A polling mode allows an application polls for data and remain active in user space and not switch to kernel mode and not cause context switching. In some cases, an interrupt causes switch from user space to kernel space to handle interrupts, which causes context switch from user space to kernel space and disrupts application and reduces I/O processing speed.

An application can perform packet processing in connection with 3GPP Radio Access Network (RAN) and Core Network (CN), Transport Network (TN) from Broadband Forum and Internet Engineering Task Force (IETF), ITU-T (GSTR-TN5G), IEEE (NGFI 1914), and so forth. Packet processing can include using Network Function Virtualization (NFV), software-defined networking (SDN), virtualized network function (VNF), Evolved Packet Core (EPC), or 5G network slicing. Some example implementations of NFV are described in European Telecommunications Standards Institute (ETSI) specifications or Open Source NFV Management and Orchestration (MANO) from ETSI's Open Source Mano (OSM) group. VNF can include a service chain or sequence of virtualized tasks executed on generic configurable hardware such as firewalls, domain name system (DNS), caching or network address translation (NAT) and can run in virtual execution environments. VNFs can be linked together as a service chain. In some examples, EPC is a 3GPP-specified core architecture at least for Long Term Evolution (LTE) access. 5G network slicing can provide for multiplexing of virtualized and independent logical networks on the same physical network infrastructure.

A packet can include a header and payload. A header can be a media access control (MAC) source and destination addresses, EtherType, Internet Protocol (IP) source and destination addresses, IP protocol, Transmission Control Protocol (TCP) port numbers, virtual local area network (VLAN) or Multi-Protocol Label Switching (MPLS) tags.

To transmit responses to NVMe commands, for an NVMe-oF application on the target side, a polling group can: a) read the data on the connection and compose the related NVMe commands and cause the backend NVMe subsystems to execute those commands asynchronously; b) when the NVMe commands are finished by the backend NVMe subsystem, compose the response PDU according to the results of the NVMe commands, and use the write related operations to write the data on the socket connection.

Figure 3:
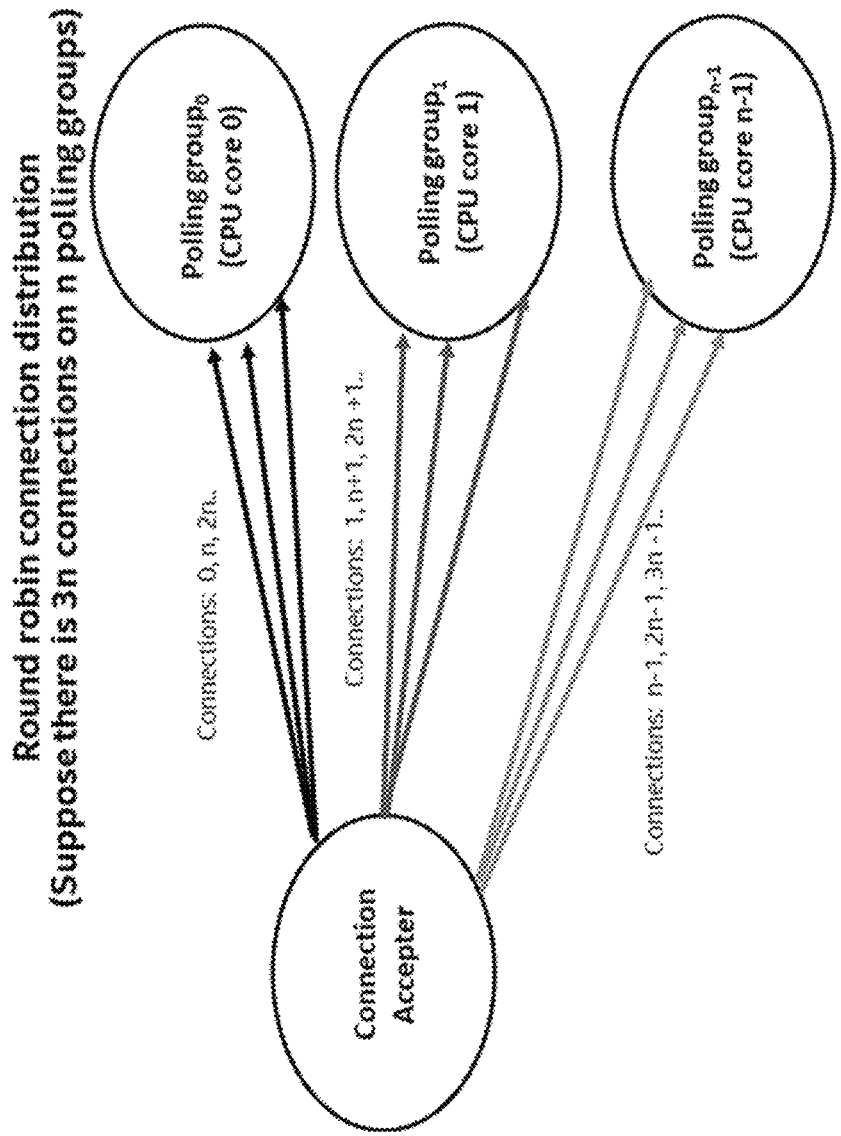
FIG. 3 shows a round robin connection distribution into different polling groups.

FIG. 3 shows a round robin connection distribution into different polling groups. If there are n polling groups, and suppose there are 3n connections, round robin can be used to schedule these connections. Round robin can distribute connections according to IP address, port. Connection id with 0, n, 2n can be handled by the first polling group (e.g., Polling group$_0$); connection id of 1, n+1, 2n+1 can be handled by the second polling group (e.g., Polling group$_1$); and connection id of n−1, 2n−1, 3n−1 can be handled by the (n−1)th polling group (e.g., Polling group$_{n-1}$).

Figure 4:
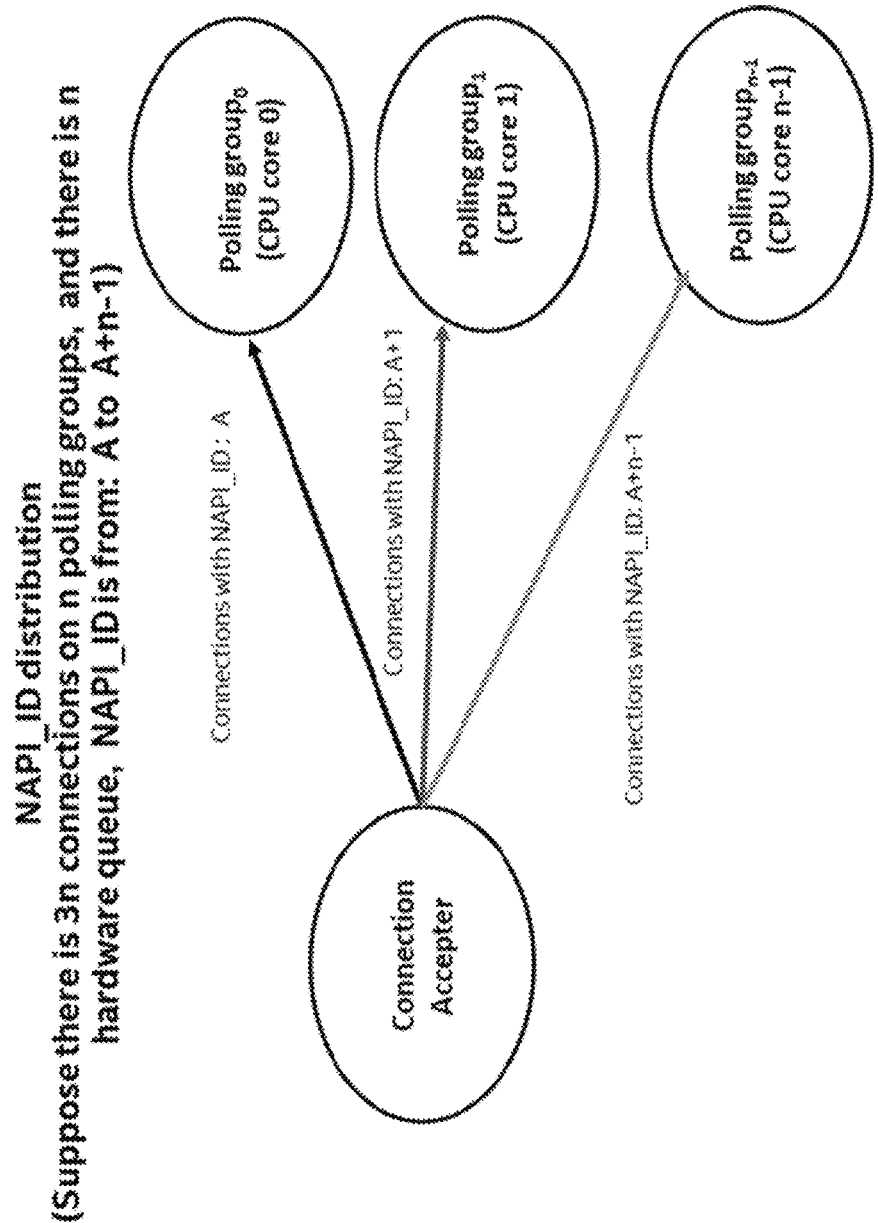
FIG. 4 depicts a manner of assigning connections based on a queue identifier.

FIG. 4 depicts a manner of assigning connections based on a queue identifier. In this example, a queue identifier corresponds to a NAPI_ID. If a NAPI_ID-based scheduling is used, supposing there are also N hardware queues and the NAPI_IDs of the incoming connections loop from A to A+N−1, then a thread will still handle connections with the same NAPI_ID. Threads or CPU cores that process connections access a same queue. For a socket connection, application issues getsockopt system call for Linux to obtain the NAPI_ID information (e.g., ADQ queue number), and TCP transport acceptor maps connections which have the same NAPI_ID to the same socket polling group. A socket polling group runs on a thread, which is bound to a core, though the thread can be migrated to another core.

Figure 5:
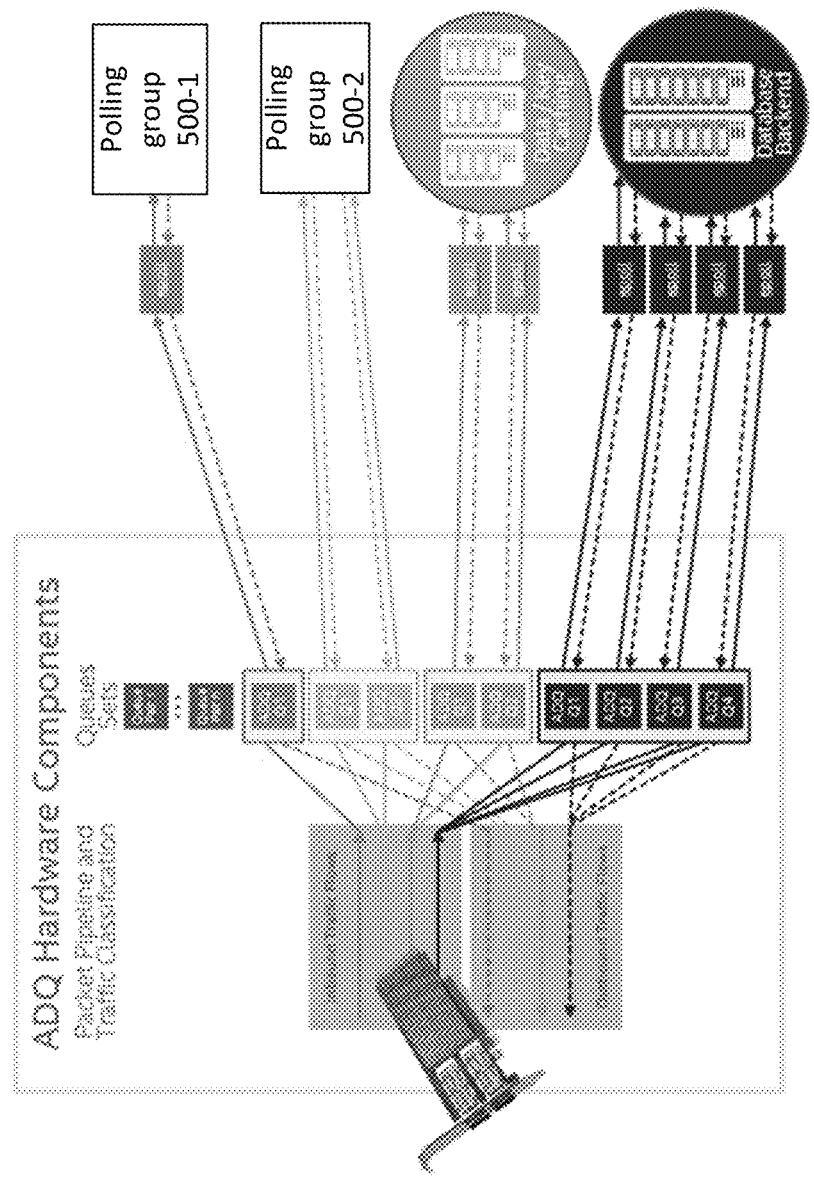
FIG. 5 depicts an example of use of an Application Device Queue (ADQ).

FIG. 5 depicts an example of ADQ allocation for various uses. Use of ADQ can dedicate isolated queues to applications, and these queues can be exclusively accessed by thread(s) that execute associated applications. For example, using ADQ, a NIC can allocate content to one or more queues where the one or more queues are mapped to access by software, software can include a polling group, storage application, or application, and one or more queues can be allocated in memory on the NIC or on a host. ADQ can prevent network traffic contention whereby different applications or processes attempt to access the same queue and cause locking or contention, and the performance (e.g., latency) of packet availability becomes unpredictable. Moreover, ADQ provides quality of service (QoS) control for dedicated application traffic queues for received packets or packets to be transmitted. Various techniques to implement ADQ or queues are described in U.S. Pat. No. 10,547,559, which is incorporated by reference herein in its entirety.

According to various embodiments, an ADQ can be dedicated to a single polling group for an NVMe-oF communication using TCP by allocating connections to a polling group based on identifier (e.g., NAPI_ID). Applications can reduce the context switching to achieve lower latency of packet receipt using TCP as a transport layer. For example, for N queues and a queue is assigned a unique NAPI_ID, then all the NAPI_IDs compose a set containing N different NAPI_IDs. A thread running a polling group is allocated a subset of N different NAPI_IDs, so that a polling group exclusively uses a queue or queues for one or more NAPI_IDs and no other polling group accesses the queue or queues so that TCP connections having the same NAPI_IDs are processed by the same thread. An application can determine which hardware queues are allocated to a NAPI_ID through the attribute on Sock_FD (e.g., getsockopt with "SO_INCOMING_NAPI_ID" in Linux). In this example, polling groups 500-1 and 500-2 are shown. Polling group 500-1 can be allocated use of an ADQ whereas polling group 500-2 can be allocated use of two ADQs.

Figure 6:
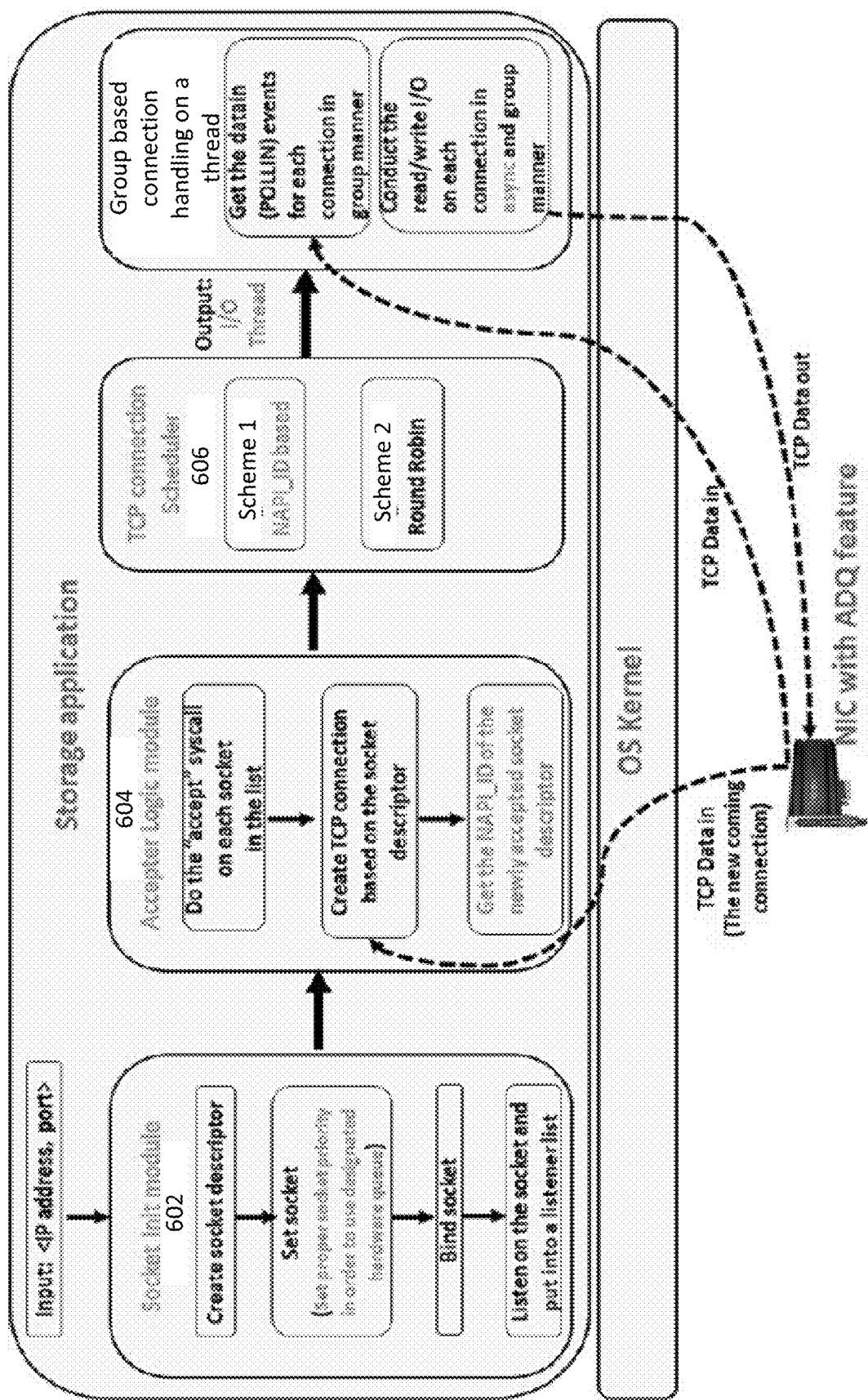
FIG. 6 shows a storage application that can allocate connections to a polling group.

FIG. 6 shows an example storage application that can allocate connections to a polling group. An example allocation of active TCP connections to polling groups can include: 1) creating a listener socket in a socket init module; 2) determining the incoming TCP connection based on the accepted socket file descriptor (denoted as Sock_FD) via the accept call on the listener socket; 3) a TCP scheduler module dispatching the connection to a designated thread that runs a polling group to monitor; and 4) in a TCP connection handling thread (denoted as I/O thread), the I/O thread monitoring dispatched connections together in an asynchronous manner.

Before starting an application, socket init module 602 calls "setsockopt" POSIX API in Linux to set a priority on a listener socket to cause the storage application to use the configured isolated queue(s). Acceptor logic module 604 can obtain a NAPI_ID of the TCP connection through getsockopt (e.g., through SO_INCOMING_NAPI_ID in Linux if it is supported). The NAPI_ID can represent an assigned hardware queue for a TCP connection. For example, if the application uses a traffic class with 3 hardware queues, then the incoming TCP connections accepted by the listener socket have three different NAPI_IDs, e.g., 789, 790 and 791. These NAPI_IDs can be used by the TCP connection scheduler 606 to construct a NAPI_ID based scheduling. In some examples, TCP connection scheduler 606 can apply a round robin scheme to dispatch the connections fairly to threads without considering the NAPI_ID belonging to a TCP connection. In some examples, TCP connection scheduler 606 can apply a NAPI_ID based to schedule a connection by searching for an existing polling group that polls for that NAPI_ID. If such a polling group exists, TCP connection scheduler 606 identifies the I/O thread that executes this existing polling group and dispatches the connection to this thread. If there is no assigned I/O thread, TCP connection scheduler 606 identifies an I/O thread which has a least number of connections, and launches a new polling group to monitor the NAPI_ID on the identified thread. An I/O thread that executes a polling group can obtain "data in" indicators (received packets) by monitoring a queue in a network interface card (NIC) with ADQ or isolated queues. The ADQ or queue can be allocated to a particular NAPI_ID. The polling group can also conduct reads/writes on a connection in an asynchronous manner for data to be transmitted from a NIC with ADQ using an allocated queue. The polling group can apply epoll techniques to poll for I/O activity.

Figure 7:
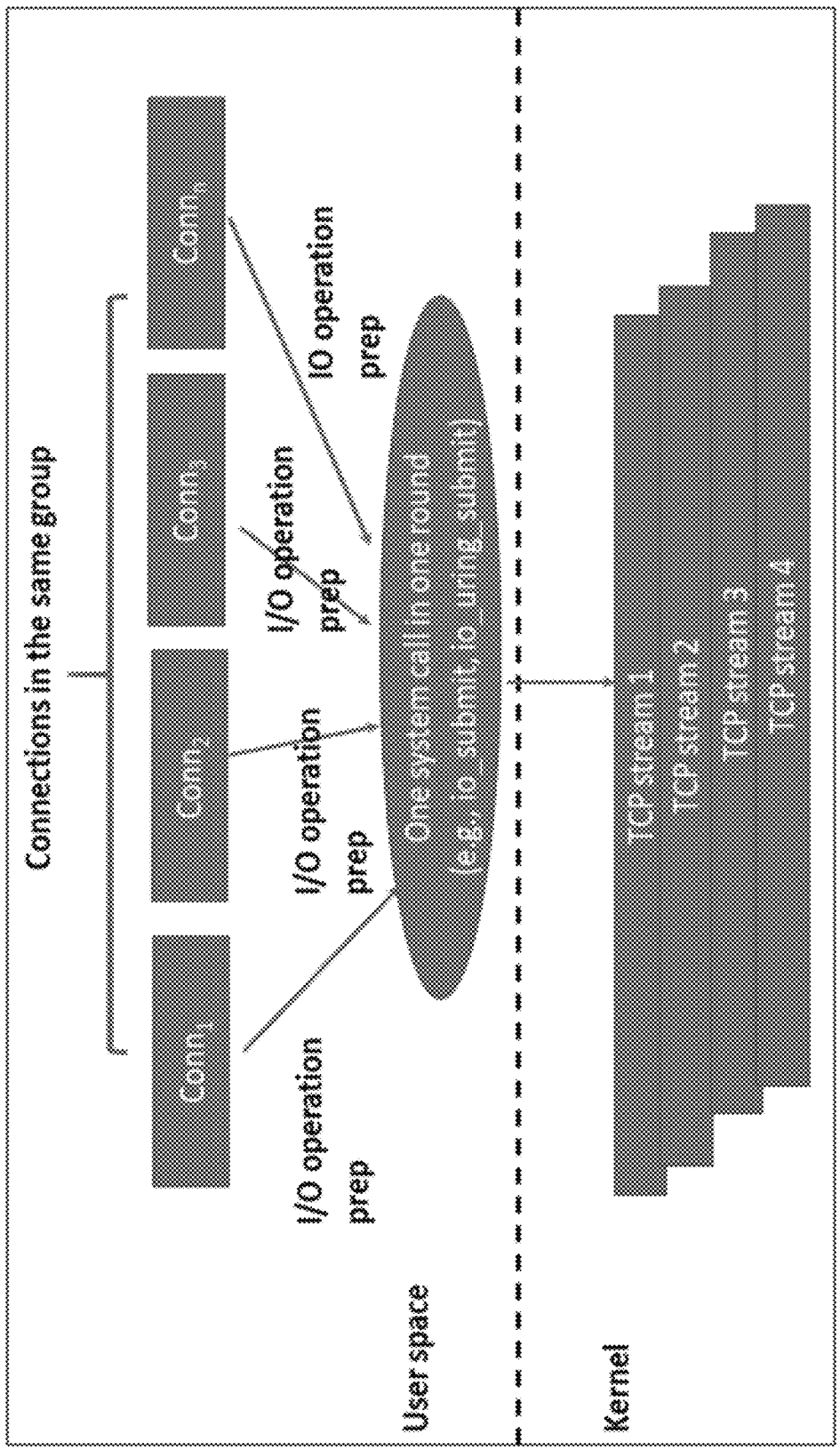
FIG. 7 shows an example where a group based asynchronous I/O policy is used.

FIG. 7 shows an example where the connections in a polling group executed by a thread use a group based asynchronous I/O policy. Various embodiments provide for polling connections in a group and issuing less system call number to an operating system to know: (1) which connections have incoming data; (2) send data on those active connections in a grouped manner (e.g., by one system call in a round, e.g., via "io_submit" provided by libiao library); (3) read the data on the active connections in a grouped manner (e.g., by one system call in a round, e.g., via "io_uring_submit" provided by liburing library in linux). For TCP connections served by a dedicated thread, epoll can be used to track the POLLIN event on a socket to determine which socket has received data or packet. A system call can be made to monitor the events of registered Sock_FDs via the event file descriptor, to collect POLLIN events from many Sock_FDs.

In some examples, for read operation handling, during a round, a connection can prepare at most one read task. Read operations for a Sock_FD can be merged and one system call made to submit the I/O (e.g., using io_submit via libaio engine or io_uring_submit via liburing engine). A group based I/O submission can save system call overhead. For example, if there are write operations on 32 connections, I/O writes on the connections can be collected and issued as one io_submit (e.g., using libaio library). In this manner, 31 system calls in a round can be avoided. When the I/O operations on read tasks are submitted, the kernel can be queried to provide I/Os.

In some examples, for a write operation handling, in a round, a connection can prepare at most one write task. Write operations for a Sock_FD can be merged and one system call made to submit the I/O (e.g., using io_submit via libaio engine or io_uring_submit via liburing engine). A group based I/O submission can save system call overhead. For example, if there are write operations on 64 connections, I/O writes on the connections can be collected and issued as one io_submit (e.g., using libaio library). In this manner, 63 system calls in a round can be avoided. When the I/O operations on write tasks are submitted, some functions (e.g., "io_uring_peek_cqe" in liburing library in Linux) can be called to query whether the kernel has completed the I/Os requested by the application in user space.

Figure 8:
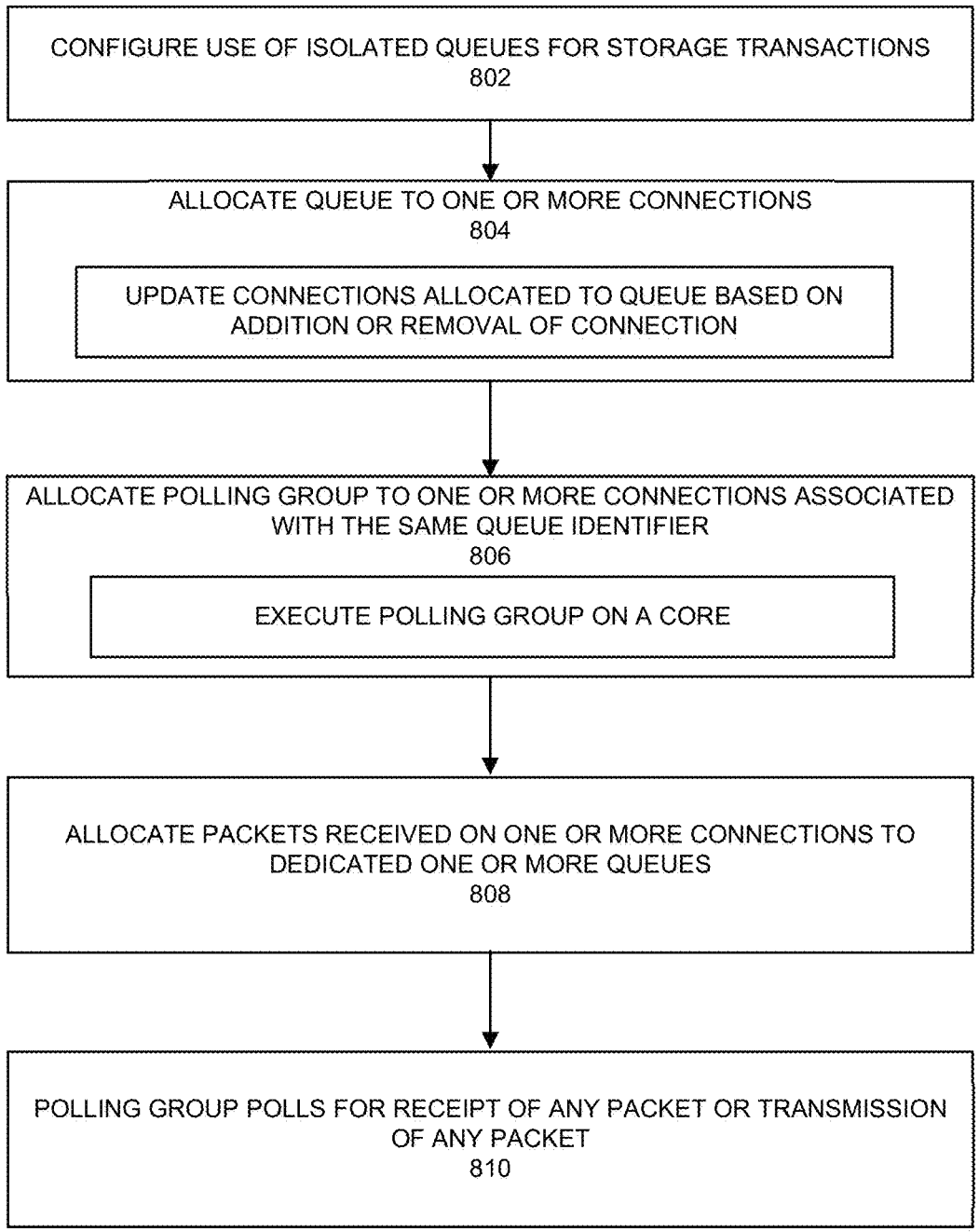
FIG. 8 depicts a process in accordance with some embodiments.

FIG. 8 depicts an example process. The process can be used to provide predictable latency for NVMe-oF communications using TCP as a transport layer. However, other transport layers can be used such as RDMA, InfiniBand, FibreChannel, User Datagram Protocol (UDP), quick User Datagram Protocol (UDP) Internet Connections (QUIC), and so forth. At 802, a storage application configures use of isolated queues for transmit and receipt of storage transactions. For example, the application can be a storage application that uses NVMe or NVMe-oF to communicate with a partner. The isolated queues can be provided in a memory accessible to a network interface including a host system. For example, the isolated queues can be ADQ.

At 804, the storage application associates a queue with one or more connection(s). For example, the storage application can associate any new TCP connection with a queue identifier (e.g., NAPI_ID). In addition, any terminated socket connection can be removed from being associated with a queue identifier. One or more queues and corresponding queue identifiers can be allocated for use by connection(s).

At 806, a polling group is allocated for connection(s) associated with the same queue identifier. In some examples, a polling group can be executed on a dedicated CPU core that does not execute another polling group. In some examples, a polling group can use an epoll scheme to detect the I/O events for connections associated with the same queue identifier.

At 808, a network interface can allocate connections to dedicated one or more queues. For example, the network interface can apply traffic class (TC) filtering to map the application's TCP connections to the dedicated one or more queues.

At 810, the polling group polls for receipt of any packet or transmission of any packet by an application. A polling scheme can be applied where an application does not enter sleep state and the application polls for receipt of any new packet or transmission of any packet. A driver can defer interrupts while the application polls. The packets can be received in a one or more queues dedicated to the connection or provided for transmission using one or more queues dedicated to the connection. To transmit responses to NVMe commands, the polling group can compose a response PDU according to the results of the NVMe commands, and use the write related operations to write the data on the socket connection for transmission.

Figure 9:
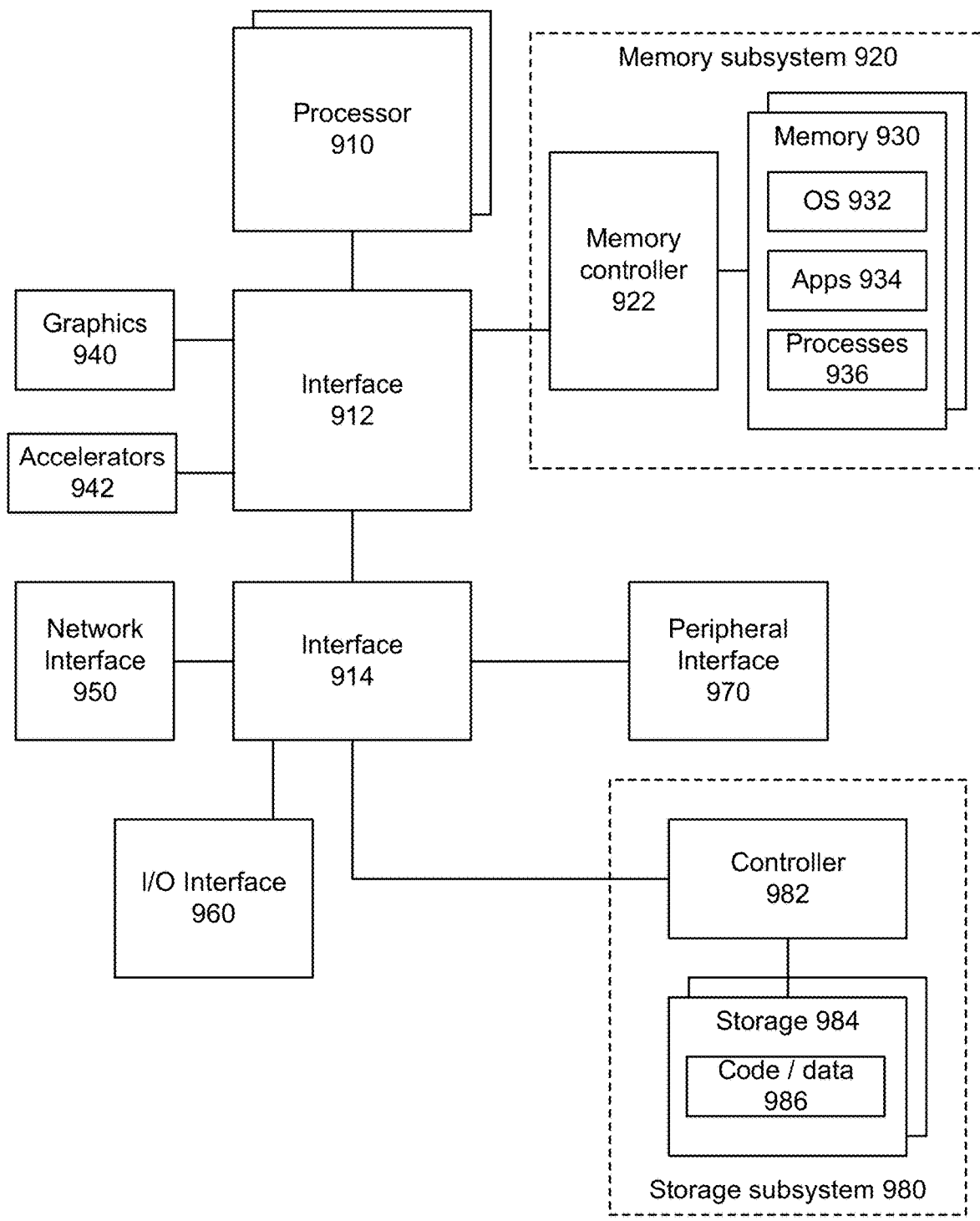
FIG. 9 depicts a system in accordance with some embodiments.

FIG. 9 depicts a system. Various embodiments can be used to poll for received packets or packets for transmission in accordance with embodiments described herein. The system can use embodiments described herein to run a storage application to allocate polling of received packets or packets for transmission to a core in accordance with embodiments described herein. System 900 includes processor 910, which provides processing, operation management, and execution of instructions for system 900. Processor 910 can include any type of microprocessor, central processing unit (CPU), graphics processing unit (GPU), processing core, or other processing hardware to provide processing for system 900, or a combination of processors. Processor 910 controls the overall operation of system 900, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 900 includes interface 912 coupled to processor 910, which can represent a higher speed interface or a high throughput interface for system components that needs higher bandwidth connections, such as memory subsystem 920 or graphics interface components 940, or accelerators 942. Interface 912 represents an interface circuit, which can be a standalone component or integrated onto a processor die. Where present, graphics interface 940 interfaces to graphics components for providing a visual display to a user of system 900. In one example, graphics interface 940 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 940 generates a display based on data stored in memory 930 or based on operations executed by processor 910 or both. In one example, graphics interface 940 generates a display based on data stored in memory 930 or based on operations executed by processor 910 or both.

Accelerators 942 can be programmable or fixed function offload engines that can be accessed or used by a processor 910. For example, an accelerator among accelerators 942 can provide compression (DC) capability, cryptography services such as public key encryption (PKE), cipher, hash/authentication capabilities, decryption, or other capabilities or services. In some embodiments, in addition or alternatively, an accelerator among accelerators 942 provides field select controller capabilities as described herein. In some cases, accelerators 942 can be integrated into a CPU or connected to CPU by various devices (e.g., a connector to a motherboard or circuit board that includes a CPU and provides an electrical interface with the CPU). For example, accelerators 942 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 942 can provide multiple neural networks, CPUs, processor cores, general purpose graphics processing units, or graphics processing units can be made available for use by artificial intelligence (AI) or machine learning (ML) models. For example, the AI model can use or include any or a combination of a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 920 represents the main memory of system 900 and provides storage for code to be executed by processor 910, or data values to be used in executing a routine. Memory subsystem 920 can include one or more memory devices 930 such as read-only memory (ROM), flash memory, one or more varieties of random access memory (RAM) such as DRAM, or other memory devices, or a combination of such devices. Memory 930 stores and hosts, among other things, operating system (OS) 932 to provide a software platform for execution of instructions in system 900. Additionally, applications 934 can execute on the software platform of OS 932 from memory 930. Applications 934 represent programs that have their own operational logic to perform execution of one or more functions. Processes 936 represent agents or routines that provide auxiliary functions to OS 932 or one or more applications 934 or a combination. OS 932, applications 934, and processes 936 provide software logic to provide functions for system 900. In one example, memory subsystem 920 includes memory controller 922, which is a memory controller to generate and issue commands to memory 930. It will be understood that memory controller 922 could be a physical part of processor 910 or a physical part of interface 912. For example, memory controller 922 can be an integrated memory controller, integrated onto a circuit with processor 910.

While not specifically illustrated, it will be understood that system 900 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 900 includes interface 914, which can be coupled to interface 912. In one example, interface 914 represents an interface circuit, which can include stand-alone components and integrated circuitry. In one example, multiple user interface components or peripheral components, or both, couple to interface 914. Network interface 950 provides system 900 the ability to communicate with remote devices (e.g., servers or other computing devices) over one or more networks. Network interface 950 can include an Ethernet adapter, wireless interconnection components, cellular network interconnection components, USB (universal serial bus), or other wired or wireless standards-based or proprietary interfaces. Network interface 950 can transmit data to a device that is in the same data center or rack or a remote device, which can include sending data stored in memory. Network interface 950 can receive data from a remote device, which can include storing received data into memory. Various embodiments can be used in connection with network interface 950, processor 910, and memory subsystem 920.

In one example, system 900 includes one or more input/output (I/O) interface(s) 960. I/O interface 960 can include one or more interface components through which a user interacts with system 900 (e.g., audio, alphanumeric, tactile/touch, or other interfacing). Peripheral interface 970 can include any hardware interface not specifically mentioned above. Peripherals refer generally to devices that connect dependently to system 900. A dependent connection is one where system 900 provides the software platform or hardware platform or both on which operation executes, and with which a user interacts.

In one example, system 900 includes storage subsystem 980 to store data in a nonvolatile manner. In one example, in certain system implementations, at least certain components of storage 980 can overlap with components of memory subsystem 920. Storage subsystem 980 includes storage device(s) 984, which can be or include any conventional medium for storing large amounts of data in a nonvolatile manner, such as one or more magnetic, solid state, or optical based disks, or a combination. Storage 984 holds code or instructions and data 986 in a persistent state (e.g., the value is retained despite interruption of power to system 900). Storage 984 can be generically considered to be a "memory," although memory 930 is typically the executing or operating memory to provide instructions to processor 910. Whereas storage 984 is nonvolatile, memory 930 can include volatile memory. In one example, storage subsystem 980 includes controller 982 to interface with storage 984. In one example controller 982 is a physical part of interface 914 or processor 910 or can include circuits or logic in both processor 910 and interface 914.

A volatile memory is memory whose state (and therefore the data stored in it) is indeterminate if power is interrupted to the device. Dynamic volatile memory requires refreshing the data stored in the device to maintain state. One example of dynamic volatile memory includes DRAM (Dynamic Random Access Memory), or some variant such as Synchronous DRAM (SDRAM). Another example of volatile memory includes cache or static random access memory (SRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WI02 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 900. More specifically, power source typically interfaces to one or multiple power supplies in system 900 to provide power to the components of system 900. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 900 can be implemented using interconnected compute sleds of processors, memories, storages, network interfaces, and other components. High speed interconnects can be used such as PCIe, Ethernet, or optical interconnects (or a combination thereof).

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, a blade includes components common to conventional servers, including a main printed circuit board (main board) providing internal wiring (e.g., buses) for coupling appropriate integrated circuits (ICs) and other components mounted to the board.

In an example, system 900 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), User Datagram Protocol (UDP), quick User Datagram Protocol (UDP) Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, and variations thereof. Data can be copied or stored to virtualized storage nodes using a protocol such as NVMe over Fabrics (NVMe-oF) or NVMe.

Figure 10:
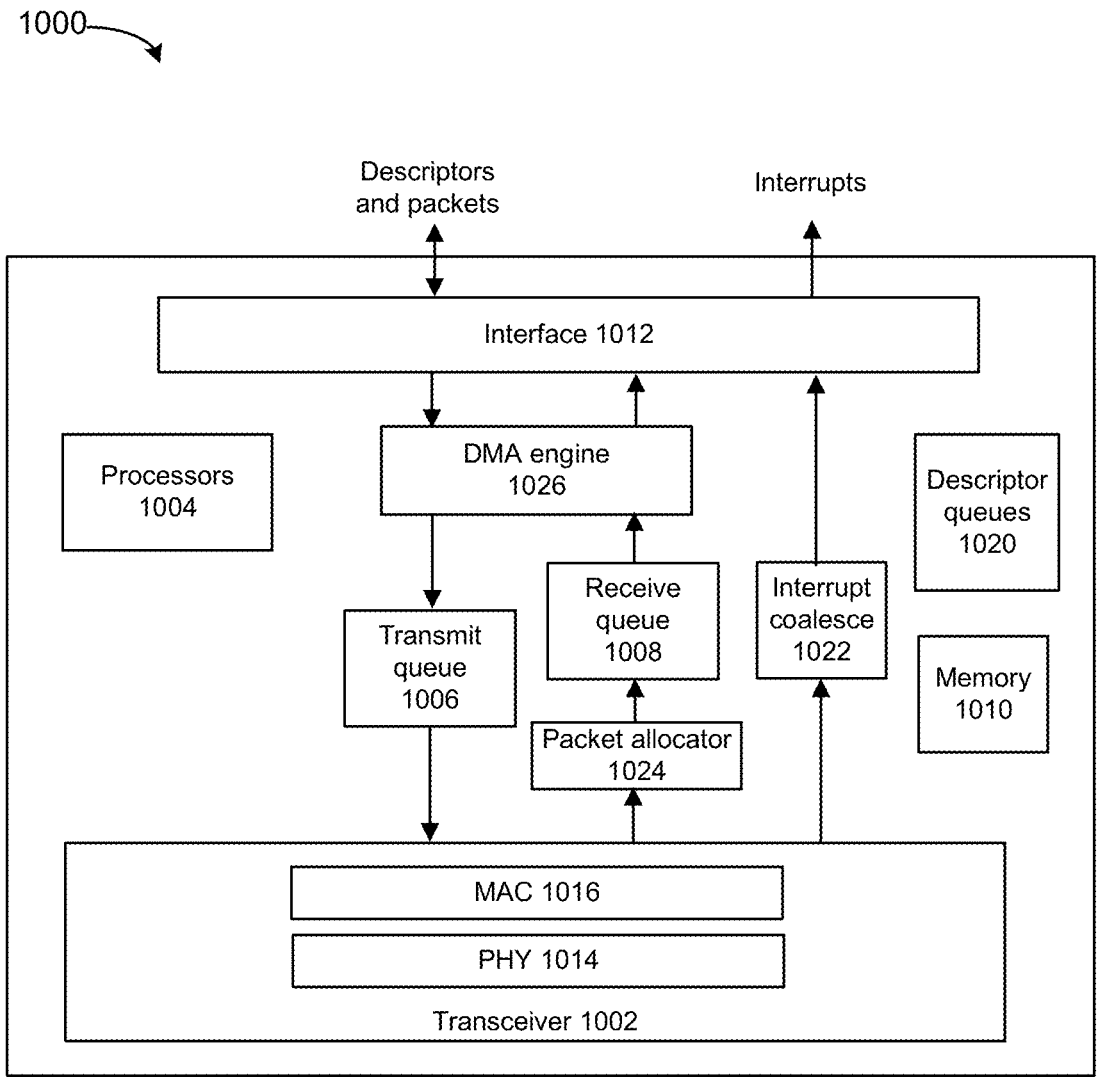
FIG. 10 depicts a network interface in accordance with some embodiments.

FIG. 10 depicts a network interface that can use embodiments or be used by embodiments. Various embodiments can be used to manage storage transactions in a manner described herein. For example, packets can be transmitted from network interface using embodiments described herein to provide dedicated queues (e.g., ADQ) for received or transmitted packets on connections with a same queue identifier and to filter received traffic for allocation to an associated one or more queues. Network interface 1000 can include transceiver 1002, processors 1004, transmit queue 1006, receive queue 1008, memory 1010, and bus interface 1012, and DMA engine 1026. Transceiver 1002 can be capable of receiving and transmitting packets in conformance with the applicable protocols such as Ethernet as described in IEEE 802.3, although other protocols may be used. Transceiver 1002 can receive and transmit packets from and to a network via a network medium (not depicted). Transceiver 1002 can include physical layer (PHY) circuitry 1014 and media access control (MAC) circuitry 1016. PHY circuitry 1014 can include encoding and decoding circuitry (not shown) to encode and decode data packets according to applicable physical layer specifications or standards. MAC circuitry 1016 can be configured to assemble data to be transmitted into packets, that include destination and source addresses along with network control information and error detection hash values. MAC circuitry 1016 can be configured to process MAC headers of received packets by verifying data integrity, removing preambles and padding, and providing packet content for processing by higher layers.

Processors 1004 can be any a combination of a: processor, core, graphics processing unit (GPU), field programmable gate array (FPGA), application specific integrated circuit (ASIC), or other programmable hardware device that allow programming of network interface 1000. For example, processors 1004 can provide for allocation or deallocation of intermediate queues. For example, a "smart network interface" can provide packet processing capabilities in the network interface using processors 1004.

Packet allocator 1024 can provide distribution of received packets for processing by multiple CPUs or cores using timeslot allocation described herein or RSS. When packet allocator 1024 uses RSS, packet allocator 1024 can calculate a hash or make another determination based on contents of a received packet to determine which CPU or core is to process a packet.

Interrupt coalesce 1022 can perform interrupt moderation whereby network interface interrupt coalesce 1022 waits for multiple packets to arrive, or for a time-out to expire, before generating an interrupt to host system to process received packet(s). Receive Segment Coalescing (RSC) can be performed by network interface 1000 whereby portions of incoming packets are combined into segments of a packet. Network interface 1000 provides this coalesced packet to an application.

Direct memory access (DMA) engine 1026 can copy a packet header, packet payload, and/or descriptor directly from host memory to the network interface or vice versa, instead of copying the packet to an intermediate buffer at the host and then using another copy operation from the intermediate buffer to the destination buffer.

Memory 1010 can be any type of volatile or non-volatile memory device and can store any queue or instructions used to program network interface 1000. Transmit queue 1006 can include data or references to data for transmission by network interface. Receive queue 1008 can include data or references to data that was received by network interface from a network. Descriptor queues 1020 can include descriptors that reference data or packets in transmit queue 1006 or receive queue 1008. Bus interface 1012 can provide an interface with host device (not depicted). For example, bus interface 1012 can be compatible with peripheral connect Peripheral Component Interconnect (PCI), PCI Express, PCI-x, Serial ATA (SATA), and/or Universal Serial Bus (USB) compatible interface (although other interconnection standards may be used).

Figure 11:
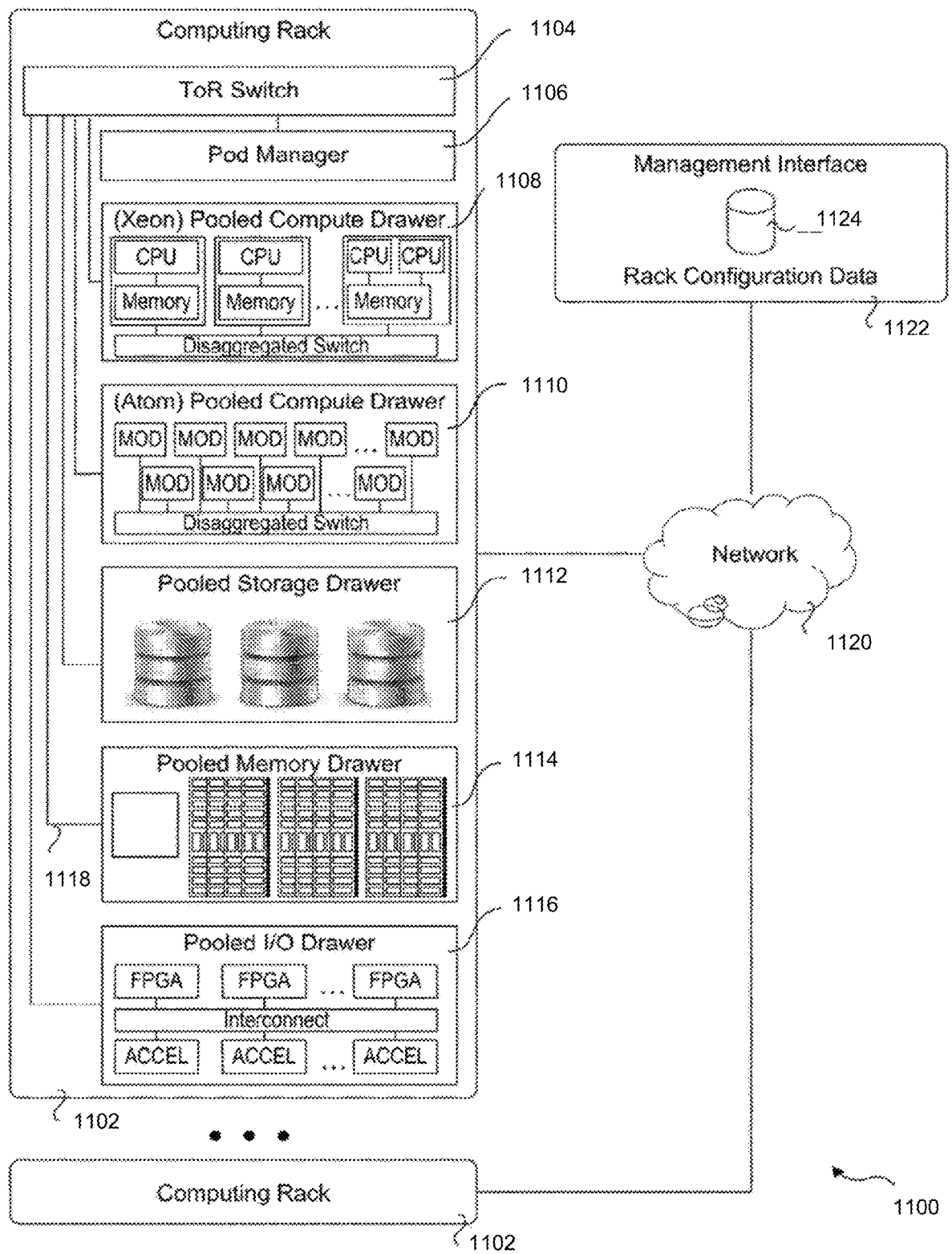
FIG. 11 depicts an environment in accordance with some embodiments.

FIG. 11 depicts an environment 1100 includes multiple computing racks 1102, some including a Top of Rack (ToR) switch 1104, a pod manager 1106, and a plurality of pooled system drawers. Various embodiments can be used to perform storage transactions in a manner described herein. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an Intel® XEON® pooled computer drawer 1108, and Intel® ATOM™ pooled compute drawer 1110, a pooled storage drawer 1112, a pooled memory drawer 1114, and a pooled I/O drawer 1116. Some of the pooled system drawers is connected to ToR switch 1104 via a high-speed link 1118, such as a 40 Gigabit/second (Gb/s) or 100 Gb/s Ethernet link or a 100+Gb/s Silicon Photonics (SiPh) optical link.

Multiple of the computing racks 1102 may be interconnected via their ToR switches 1104 (e.g., to a pod-level switch or data center switch), as illustrated by connections to a network 1120. In some embodiments, groups of computing racks 1102 are managed as separate pods via pod manager(s) 1106. In one embodiment, a single pod manager is used to manage racks in the pod. Alternatively, distributed pod managers may be used for pod management operations.

Environment 1100 further includes a management interface 1122 that is used to manage various aspects of the environment. This includes managing rack configuration, with corresponding parameters stored as rack configuration data 1124.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Example 1 includes a computer-implemented method comprising: assigning a polling group to poll for storage transactions associated with a first group of one or more particular queue identifiers, wherein the one or more particular queue identifiers are associated with one or more queues that can be accessed solely using the polling group and no other polling group.

Example 2 includes any example, and includes allocating the polling group to execute on a central processing unit (CPU) core that runs no other polling group.

Example 3 includes any example, and includes allocating a second polling group to execute on a second central processing unit (CPU) core, wherein the second polling group is to poll for storage transactions for a second group of one or more particular queue identifiers that are different than the one or more particular queue identifiers of the first group, wherein the second group of one or more particular queue identifiers are associated with one or more queues that can be accessed solely using the second polling group.

Example 4 includes any example, and includes allocating a new connection to a queue identifier and allocating a polling group for the queue identifier of the new connection.

Example 5 includes any example, and includes based on termination of a connection, de-allocating the terminated connection from its queue identifier and de-allocating a polling group from polling for input/output operations associated with the terminated connection.

Example 6 includes any example, wherein the one or more queues include at least one queue allocated by a network interface for exclusive access by software and the software comprises the polling group.

Example 7 includes any example, wherein the polling group performs a busy polling mode and defers interrupts to identify at least one input or output operation until after busy polling mode ends.

Example 8 includes any example, wherein the storage transactions comprise Non-volatile Memory Express over Fabrics using a transport layer comprising one of: Transmission Control Protocol (TCP), InfiniBand, FibreChannel, or User Datagram Protocol (UDP).

Example 9 includes any example, and includes a non-transitory computer-readable medium, comprising instructions that if executed by one or more processors, cause the one or more processors to: execute a polling group to poll for storage transactions associated with a first group of one or more particular queue identifiers, wherein the one or more particular queue identifiers are associated with one or more queues that can be accessed using the polling group and no other polling group.

Example 10 includes any example, wherein the polling group is to execute on a processor that runs no other polling group.

Example 11 includes any example, and includes instructions stored thereon, that if executed by one or more processors, cause the one or more processors to: execute a second polling group on a second processor, wherein the second polling group is to poll for storage transactions for a second group of one or more particular queue identifiers that are different than the one or more particular queue identifiers of the first group, wherein the second group of one or more particular queue identifiers are associated with one or more queues that can be accessed by the second polling group but are not accessible by the polling group.

Example 12 includes any example, and includes instructions stored thereon, that if executed by one or more processors, cause the one or more processors to: allocate a new connection to a queue identifier and allocate a polling group for the queue identifier of the new connection.

Example 13 includes any example, and includes instructions stored thereon, that if executed by one or more processors, cause the one or more processors to: based on termination of a connection, de-allocate the terminated connection from its queue identifier and de-allocate a polling group from polling for input/output operations associated with the terminated connection.

Example 14 includes any example, wherein the one or more queues include at least one Application Device Queue (ADQ) accessible to a network interface.

Example 15 includes any example, wherein the polling group performs a busy polling mode and defers interrupts to report input/output transactions until after busy polling mode ends.

Example 16 includes any example, wherein the storage transactions comprise Non-volatile Memory Express over Fabrics using a transport layer comprising one of: Transmission Control Protocol (TCP), InfiniBand, FibreChannel, or User Datagram Protocol (UDP).

Example 17 includes any example, and includes an apparatus comprising: a network interface; a cache; and at least one central processing unit (CPU) processor coupled to the network interface and the cache, the at least one CPU processor configured to: execute a polling group to poll for storage transactions associated with a first group of one or more particular queue identifiers, wherein the one or more particular queue identifiers are associated with one or more queues that can be accessed using the polling group and no other polling group.

Example 18 includes any example, wherein the polling group is to execute on a processor that runs no other polling group.

Example 19 includes any example, wherein the at least one processor is configured to: execute a second polling group on a second processor, wherein the second polling group is to poll for storage transactions for a second group of one or more particular queue identifiers that are different than the one or more particular queue identifiers of the first group, wherein the second group of one or more particular queue identifiers are associated with one or more queues that can be accessed using the second polling group but are not accessible by the polling group.

Example 20 includes any example, wherein the one or more queues include at least one queue allocated by a network interface for exclusive access by software and the software comprises the polling group.

What is claimed is:

1. A computer-implemented method comprising:
    a first polling group, executing on a first central processing unit (CPU) core, polling for identified storage transactions received in one or more packets in a first group of one or more queues, wherein the first group of one or more queues are associated with a first group of one or more particular queue identifiers and the first group of one or more queues are allocated in a memory of a network interface device;
    a second polling group, executing on a second CPU core, polling for identified storage transactions received in one or more packets in a second group of one or more queues, wherein the second polling group polls for storage transactions for a second group of one or more particular queue identifiers and wherein the second group of one or more queues are allocated in the memory of the network interface device; and
    performing the storage transactions identified by the first polling group and the second polling group, wherein
        the first polling group performs a busy polling mode and defers interrupts to identify at least one input or output operation until after busy polling mode ends,
        the busy polling mode comprises polling for the storage transactions in user space,
        the first polling group polls the first group of one or more queues and not the second group of one or more queues,
        the second polling group polls the second group of one or more queues and not the first group of one or more queues,
        at least one transport protocol connection between a Non-volatile Memory Express over Fabrics (NVMe-oF) initiator and a NVMe-oF target is assigned to a queue of the first group of one or more queues, and
        the storage transactions are based on NVMe-oF.

2. The method of claim 1, wherein the first CPU core executes the first polling group and no other polling group.

3. The method of claim 1, comprising allocating a transport protocol connection to a queue identifier and allocating the first polling group to the queue identifier of the transport protocol connection.

4. The method of claim 1, comprising: based on termination of a transport protocol connection, de-allocating the terminated transport protocol connection from its queue identifier and de-allocating the first polling group from polling for input/output operations associated with the terminated transport protocol connection.

5. The method of claim 1, wherein the storage transactions are received using a transport layer comprising one of: Transmission Control Protocol (TCP), InfiniBand, FibreChannel, or User Datagram Protocol (UDP).

6. The method of claim 1, wherein the first polling group polls for storage transactions in user space.

7. The method of claim 1, wherein a single queue of the one or more queues is allocated to multiple different transport protocol connections and the first polling group polls for storage transactions associated with the multiple different transport protocol connections.

8. A non-transitory computer-readable medium, comprising instructions that if executed by one or more processors, cause the one or more processors to:
    execute a first polling group, on a first central processing unit (CPU) core, to poll for identified storage transactions received in one or more packets in a first group of one or more queues, wherein the first group of one or more queues are associated with a first group of one or more particular queue identifiers and wherein the first group of one or more queues are allocated in a memory of a network interface device;

execute a second polling group, on a second CPU core, to poll for identified storage transactions received in one or more packets in a second group of one or more queues, wherein the second polling group polls for storage transactions for a second group of one or more particular queue identifiers and wherein the second group of one or more queues are allocated in the memory of the network interface device; and perform the storage transactions identified by the first polling group and the second polling group, wherein the first polling group performs a busy polling mode and defers interrupts to identify at least one input or output operation until after busy polling mode ends, the busy polling mode comprises polling for the storage transactions in user space, the one or more queues are polled using the first polling group and not the second polling group, and the storage transactions are based on Non-volatile Memory Express over Fabrics (NVMe-oF).

9. The non-transitory computer-readable medium of claim 8, wherein the first CPU core executes the first polling group and no other polling group.

10. The non-transitory computer-readable medium of claim 8, comprising instructions stored thereon, that if executed by one or more processors, cause the one or more processors to:

allocate a transport protocol connection between an NVMe-oF initiator and NVMe-oF target to a queue identifier and allocate the first polling group to the queue identifier of the transport protocol connection.

11. The non-transitory computer-readable medium of claim 8, comprising instructions stored thereon, that if executed by one or more processors, cause the one or more processors to:

based on termination of a transport protocol connection, de-allocate the terminated transport protocol connection from its queue identifier and de-allocate the first polling group from polling for input/output operations associated with the terminated transport protocol connection.

12. The non-transitory computer-readable medium of claim 8, wherein the one or more queues include at least one Application Device Queue (ADQ) accessible to the network interface device.

13. The non-transitory computer-readable medium of claim 8, wherein the storage transactions are received using a transport layer comprising one of: Transmission Control Protocol (TCP), InfiniBand, FibreChannel, or User Datagram Protocol (UDP).

14. An apparatus comprising:

an interface at least one central processing unit (CPU) processor coupled to the interface, the at least one CPU processor configured to:

execute a first polling group, on a first core of the CPU, to poll to identify storage transactions received in one or more packets in a first group of one or more queues, wherein the first group of one or more queues are associated with a first group of one or more particular queue identifiers and the first group of one or more queues are allocated in a memory of a network interface device;

execute a second polling group, on a second core of the CPU, to poll to identify storage transactions, wherein the second polling group is to poll for storage transactions for a second group of one or more particular queue identifiers and wherein the second group of one or more queues are allocated in the memory of the network interface device; and process the storage transactions identified by the first polling group and the second polling group, wherein the first polling group is to perform a busy polling mode and defer interrupts to identify at least one input or output operation until after busy polling mode ends, the busy polling mode comprises polling for the storage transactions in user space, the one or more queues are polled using the first polling group and not the second polling group and the storage transactions are based on Non-volatile Memory Express over Fabrics (NVMe-oF).

15. The apparatus of claim 14, wherein the first polling group is to execute on the first core of the CPU and the first core is to executes no other polling group.

\* \* \* \* \*